Nov. 18, 1952 W. W. EITEL ET AL 2,618,745

TELEVISION TRANSMISSION SYSTEM

Filed May 31, 1950

INVENTORS
William W. Eitel
BY Jack A. McCullough
Harold E. Sny
ATTORNEY

Patented Nov. 18, 1952 2,618,745

UNITED STATES PATENT OFFICE 2,618,745

TELEVISION TRANSMISSION SYSTEM

William W. Eitel, Woodside, and Jack A. McCullough, Millbrae, Calif., assignors to Eitel-McCullough, Inc., San Bruno, Calif., a corporation of California Application May 31, 1950, Serial No. 165,128

3 Claims. (Cl. 250—27)

Our invention relates to an improved method for amplifying television signals or the like. This application contains method claims, it being noted that apparatus claims are contained in a divisional application, Serial No. 232,293, filed June 19, 1951.

It is generally known that properly designed electron tubes used in the generation and amplification of radio frequency power may be satisfactorily operated at very high peak power output levels without exceeding the average current and dissipation ratings of the tube, providing the power is being drawn over relatively short periods of time. For example, peak powers hundreds or thousands of times greater than the average power may be safely obtained from a tube. Such peak power operation of electron tubes is common practice under pulse working conditions, as in radar. Tubes working under these short period conditions not only will handle large orders of power but will do so at comparatively high efficiencies at frequencies beyond the normal CW range of the tube.

The broad object of our invention is to provide a television transmission system in which the radio frequency amplifier tubes employed in the transmitter may be operated under peak power conditions.

Another object is to establish the above result by a simple arrangement of tubes operable in sequence to amplify successive portions of the television signal.

Still another object is to synchronize the operation of the tubes with the television signal by utilizing the synchronizing pulses which are normally present in a video signal.

The invention possesses other objects and features of advantage, some of which, with the foregoing, will be set forth in the following description of our invention. It is to be understood that we do not limit ourselves to this disclosure of species of our invention, as we may adopt variant embodiments thereof within the scope of the claims.

Referring to the drawing.

In terms of broad inclusion our improved television transmission system has means for amplifying the television signal comprising a plurality of tubes operable in sequence, and means responsive to the synchronizing pulses of the signal for switching from tube to tube to amplify successive portions of the signal. The ordinary video signal is made up of a series of line scanning periods, each period comprising a picture interval and a blanking interval including a synchronizing pulse. In our system each tube operates for a short period of time, say for one line scanning period, while the remaining tubes are inactive, the tubes being switched from one to another during the blanking intervals. By this method the tubes may be operated under the desired peak power conditions.

Figure 1:
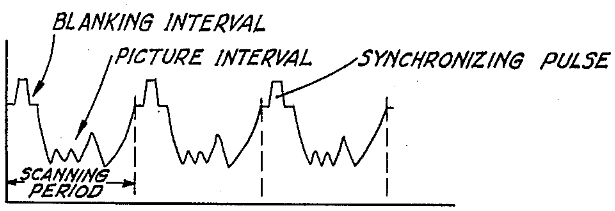
Figure 1 shows the wave shape of a conventional video signal used in television practice.

In greater detail, Figure 1 shows the wave form of a video signal during three line scanning periods, plotting the voltage or current amplitude vertically against time horizontally. Each scanning period comprises a picture interval containing signal fluctuations during the scanning of one line in the image, and also comprises a blanking interval containing the blanking impulse and also a superimposed synchronizing pulse. The amplitude at the blanking region reduces the signal to black level and the superimposed pulse is used to initiate the horizontal scanning generator at the receiver. Under present standards the scanning period is about 63.3 microseconds of which about 9.5 microseconds are occupied by the blanking interval. Such composition of a video signal during the line scanning periods is well known to those skilled in the art.

In our improved system we amplify successive portions of the signal, say successive scanning periods, by means of individual tubes operated in sequence, the tubes being switched from one to another during the blanking intervals in response to the synchronizing pulses. Since no picture signals are being transmitted during the blanking intervals, the tubes may be switched at such times without interfering with the pictorial intelligence, and, since the synchronizing pulses are already present in the video signal, it is apparent that no modification need be made in the existing standards for video signals.

Figure 2:
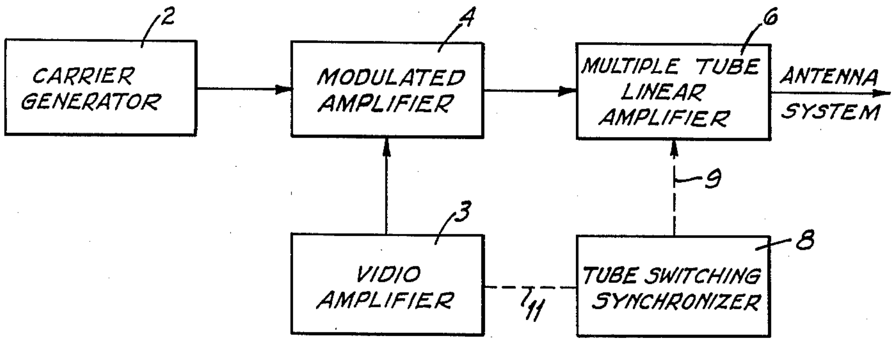
Figure 2 is a diagrammatic view illustrating our improved television transmission system.

Figure 2 shows our system incorporated in a television transmitter having a linear amplifier following the modulated stage, it being understood that this general layout is merely for purposes of illustration. The transmitter comprises a carrier generator 2 and a video amplifier 3, the carrier being combined with the video signal at the modulated amplifier 4. The video modulated signal is then amplified by a linear amplifier 6 and fed to a suitable antenna system.

Except for the amplifier 6 these various stages are similar to those used in conventional television practice.

In our system the linear stage 6 is a multiple tube amplifier, containing a plurality of tubes 7 connected in parallel, and a tube switching synchronizer 8 is provided for switching the tubes from one to another in sequence during the blanking intervals of the signal. The switching connection between the synchronizer 8 and amplifier 6 is indicated diagrammatically at 9 in Figure 2, and the synchronizing connection between the switching device 8 and video amplifier 3 is indicated diagrammatically at 11.

Figure 3:
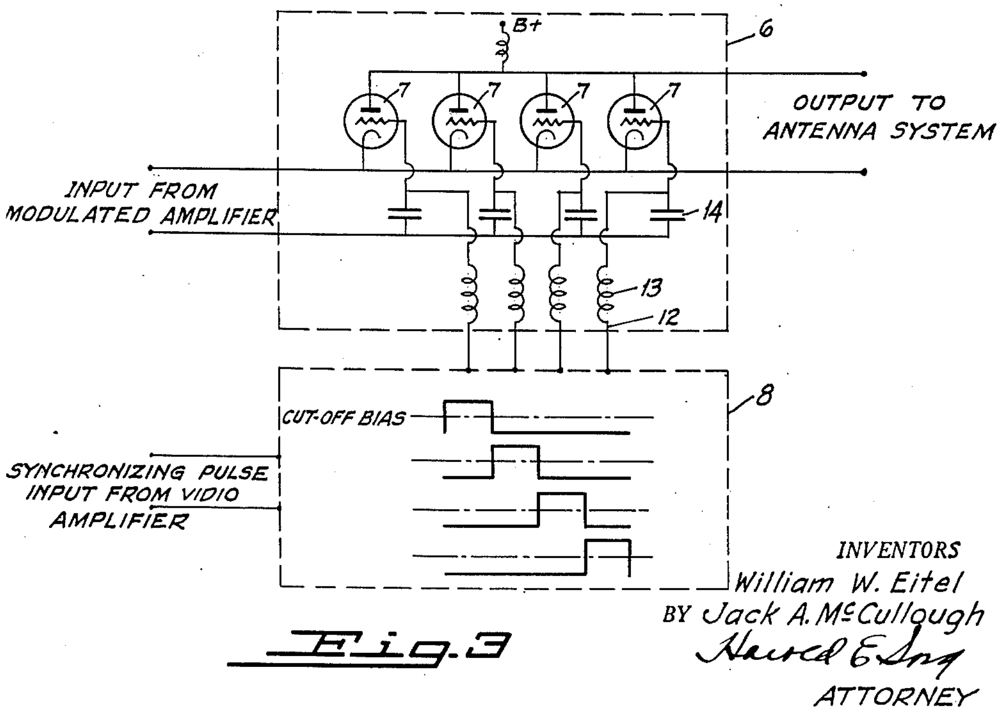
Figure 3 is a similar view showing a portion of the system in greater detail.

As shown in Figure 3 the tubes 7 in the amplifier 6 are connected for operation in sequence. A simple way to do this is to connect the tubes in parallel, as by having the input circuit connected to the grids and cathodes and the output circuit connected to the cathodes and anodes of the triodes illustrated. Any suitable number of tubes may be employed in this manner, using conventional negative-grid type tubes such as triodes or tetrodes. In actual practice, at television frequencies, it is understood that cavity type circuits would probably be employed, as will be readily understood by those skilled in the art.

A convenient and simple method of switching from tube to tube is by controlling the grid bias, namely, by normally maintaining sufficient negative potential, say several times the cut-off bias, on the grids of the tubes to prevent their operation, and then applying a correct amount of bias when a selected tube is to become operative. In this way the tubes may be operated one after the other in rapid succession while the remainder are held inactive.

As illustrated, separate grid bias leads 12 containing suitable R. F. chokes 13 are connected to the grids of the tubes, the blocking condensers 14 being provided for isolating the D. C. bias voltages. The grid bias control synchronizer 8 for switching the tubes normally maintains the grids below the cut-off voltage and periodically raises the bias voltage above cut-off as indicated by the voltage waveforms in Figure 3. These waveforms show the bias voltage conditions at four successive intervals, causing the tubes to become operative in succession. The changes in bias on the tubes are timed by the synchronizing pulses from the video amplifier, as previously mentioned, so that the tubes are switched from one to another during the blanking intervals of the video signal.

It is understood that the switching of tubes 7 may be accomplished in other ways as by cathode control. The grid bias control method is simple, however, and is preferred.

For convenience in illustrating our invention we have shown a transmitter layout in which the carrier is modulated at a lower level and subsequently amplified through a linear amplifier stage, which is conventional practice in many television transmitter designs. In some cases, however, the modulation is done at the final amplifier stage. Our system is also applicable to such high level modulation because the stage containing the plurality of tubes being switched may also function as the modulated stage, in which case the video amplifier and tube switching synchronizer would both feed into the final stage.

In any case our improved system of operating the tubes in sequence and switching from tube to tube during the blanking intervals of the television signal provides a method for continuously amplifying the signal, yet confining the operation of each tube to a short period. For example, if the tubes are switched at each blanking interval the period of individual tube operation is about 63.3 microseconds under present standards. Such a period is well suited for tubes now commercially available. If a longer period of individual tube operation is desired the tubes may be switched after every other one or more of the blanking intervals. Any desired number of tubes may be incorporated in the series being switched. The above mentioned period together with the number of tubes in the series will determine the duty cycle, namely, the ratio of "on time" to "off time" per second for any individual tube. This duty cycle may be kept sufficiently small and chosen to suit the particular type of tube employed in keeping with the optimum peak power capabilities of the tube, as will be readily appreciated.

Power outputs many times greater than those heretofore achieved in television transmitters are thus attainable with our improved system. Another advantage of our system is that specially developed tubes are not required since radio frequency power tubes having good peak power capabilities are commercially available.

While we have described our system in connection with the transmission of television signals, that being one of its most important applications, it is understood that the system may be employed to advantage in the amplification of other types of signals such, for example, as pulse-time modulated signals.

We claim:

1. The method of amplifying a signal having synchronizing pulses which comprises successively operating a plurality of tubes to amplify successive portions of the signal in uninterrupted sequence, and utilizing said pulses to synchronize the operation of the tubes with said signal.

2. The method of amplifying a television signal having blanking intervals which comprises successively operating a plurality of electron tubes to amplify successive portions of the signal in uninterrupted sequence, and synchronizing the operation of the tubes with said signal to switch from tube to tube during said blanking intervals.

3. The method of amplifying a television signal having blanking intervals with synchronizing pulses which comprises successively operating a plurality of electron tubes to amplify successive portions of the signal in uninterrupted sequence, and utilizing said pulses to synchronize the operation of the tubes with said signal to switch from tube to tube during said blanking intervals.

WILLIAM W. EITEL.
JACK A. McCULLOUGH.

REFERENCES CITED

The following references are of record in the file of this patent:

UNITED STATES PATENTS

| Number | Name | Date |
|---|---|---|
| 2,048,081 | Riggs | July 21, 1936 |
| 2,478,920 | Hansell | Aug. 16, 1949 |
| 2,541,039 | Cole | Feb. 13, 1951 |